United States Patent [19]

Amano et al.

[11] Patent Number: 4,927,344
[45] Date of Patent: May 22, 1990

[54] STEAM DOME TYPE VERTICAL TIRE PRESS

[75] Inventors: Itaru Amano, Kobe; Yasuhiko Fujieda; Katumi Ichikawa, both of Akashi; Seisuke Fukumura, Miki, all of Japan

[73] Assignee: Kabushiki Kaisha Kobe Seiko Sho, Kobe, Japan

[21] Appl. No.: 315,266

[22] Filed: Feb. 24, 1989

[30] Foreign Application Priority Data

Feb. 29, 1988 [JP] Japan ................. 63-48142

[51] Int. Cl.$^5$ ............................................ B29C 35/04
[52] U.S. Cl. ................................. 425/28.1; 277/12; 425/34.1; 425/47
[58] Field of Search ................. 425/33, 47, 35, 363, 425/28.1, 34.3, 49, 34.1, 408, 107, 233; 277/12

[56] References Cited

U.S. PATENT DOCUMENTS

| | | | |
|---|---|---|---|
| 2,358,764 | 9/1944 | Soderquist | 425/33 |
| 2,700,928 | 2/1955 | Strike | 277/12 X |
| 3,729,358 | 4/1973 | Barefoot | 425/47 X |
| 3,752,726 | 8/1973 | Barefoot | 425/47 X |
| 3,918,861 | 11/1975 | Klose | 425/47 |
| 4,283,062 | 8/1981 | Catanzaro et al. | 277/12 |
| 4,299,396 | 11/1981 | Becker et al. | 277/12 |
| 4,332,536 | 6/1982 | Singh et al. | 425/33 |
| 4,383,808 | 5/1983 | Kubo et al. | 425/47 |
| 4,563,139 | 1/1986 | Yokoyama et al. | 425/47 |
| 4,601,648 | 7/1986 | Amano et al. | 425/33 X |
| 4,669,964 | 6/1987 | Amano et al. | 425/35 X |
| 4,686,129 | 8/1987 | Yokoyama et al. | 425/47 |
| 4,804,318 | 2/1989 | Fujieda et al. | 425/34.1 |

Primary Examiner—Richard L. Chiesa
Attorney, Agent, or Firm—Oblon, Spivak, McClelland, Maier & Neustadt

[57] ABSTRACT

A steam done type vertical tire press includes an upper dome for holding an upper mold through an upper mold mounting member and a lower dome for holding a lower mold through a lower mold mounting member. The upper dome and the lower dome are abutted at respective connection edges. A dome ring is engagable with the connection edges of the upper and lower domes. A central mechanism is vertically movably located at a central position of the lower mold mounting member. A mold clamping cylinder has a pressure rod connected to the lower mold mounting member. A cylinder support extends downwardly from the lower dome through a press base for supporting the mold clamping cylinder. A mold height adjusting device is provided outside a dome space defined by the upper and lower domes for adjusting a height between the upper and lower molds. A heat/pressure medium seal is interposed at least between an outer circumferential surface of the loweer mold mounting member and an inner circumferential surface of the lower dome and between the connection edges of the upper and lower domes.

5 Claims, 9 Drawing Sheets

STEAM DOME TYPE VERTICAL TIRE PRESS

BACKGROUND OF THE INVENTION

The present invention relates to a tire press and more particularly to an improvement in a vertical tire press.

Figure 10:
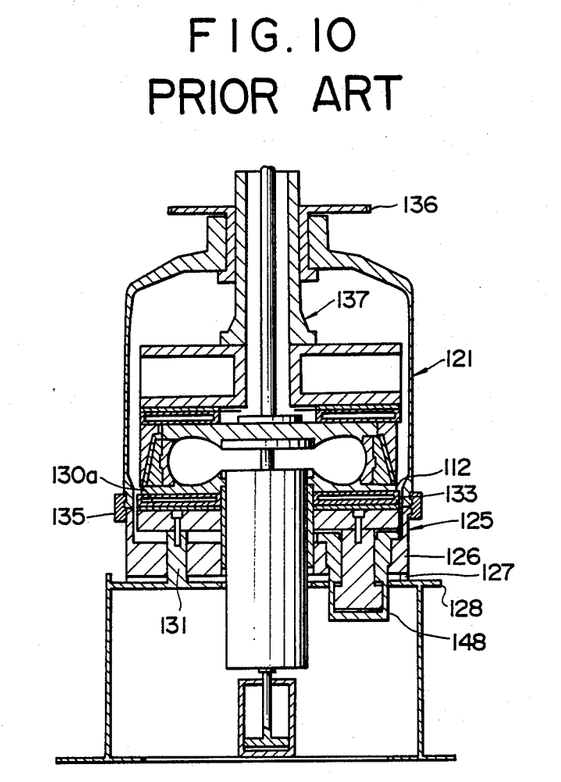
FIG. 10 is a vertical sectional view of the conventional vertical tire press.

A vertical tire press of a type such that an upper mold is vertically moved to be opened and closed with respect to a lower mold is disclosed in U.S. Pat. No. 4,563,139 and U.S. Pat. No. 4,686,129. Referring to FIG. 10 which shows the vertical tire press disclosed in this prior art, a hydraulic cylinder 148 having a short piston stroke necessary for applying a mold clamping pressure is provided at a bottom portion 126 of a lower mold shell 125. The lower mold shell 125 is resiliently supported by a spring 127 onto a press base 128. A lower mold assembly consisting of a platen support, a heat insulator 130a, a platen 133 and a mold 112 is fixed through a plurality of connecting support rods 131 to the press base 128.

An upper mold shell 121 is provided with means for vertically moving an upper mold assembly through a mold height adjusting screw cylinder threadedly engaged with a mold height adjusting nut 136 located at a central position of a top portion of the upper mold shell 121. The upper mold shell 121 is vertically movable by the rotation of a screw provided at press frame posts on opposite sides of the press base 128.

In operation, the upper mold shell 121 is closed with respect to the lower mold shell 125, and both the shells are locked by a breach ring 135. Then, the hydraulic cylinder 148 is operated to lower the assembly of both the shells 121 and 125 and thereby clamp the upper mold assembly to the lower mold assembly. Then, a heat/pressure medium such as steam is supplied through a central mechanism to a green tire. Thus, vulcanization of the green tire is carried out under the pressure with heat of the steam with the upper and lower molds maintained firmly clamped.

In the event that hydraulic pressure of the hydraulic cylinder 148 is reduced for any reason, the upper mold is opened upwardly by the pressure supplied into a molding bladder in the green tire, and the upper and lower mold shells 121 and 125 are lifted until a clearance becomes zero. That is, the upper mold is restrained from being opened over the clearance. Accordingly, the bladder and the tire are prevented from being forced out from between the upper and lower molds.

Another example of the mold height adjusting device is disclosed in U.S. Pat. No. 4,669,964. According to this mold height adjusting device, four screw shafts are mounted to an upper mold supporting platen in such a manner as to surround a central mechanism at circumferentially equal intervals. An upper mold of an upper mold assembly is mounted to the upper mold supporting platen. The screw shafts project upwardly from a top portion of a dome, and are engaged with screw nuts provided on the top portion. Nut gears are associated with the screw nuts, and mesh with a center gear provided on the top portion of the dome. Thus, the upper mold is vertically moved according to a mold thickness.

The above-mentioned vertical tire press in the prior art is improved in alignment of the upper and lower molds, accuracy, uniformity of distribution of a mold clamping force, minimization of flex of the mold mounting surfaces, etc. However, the following problem is yet present.

As is appreciated from the above description, the prior art vertical tire press is of a so-called platen heating type such that a heat source is included in the platen or steam or the like is supplied to the platen, so as to heat the tire molds.

However, in the case of vulcanizing tires of a truck, bus, etc. and a large-scale tire of a special working vehicle, a sufficient heat cannot be applied to the tire molds in the platen heating type tire press. Therefore, it is necessary to directly supply a heat/pressure medium such as steam into a dome space defined by the upper and lower domes and strongly heat the tire molds.

In a dome type vertical tire press using a lock ring mechanism connecting the upper and lower domes to be clamped by the mold clamping cylinder, the lock ring mechanism requires a mechanical clearance, and a moving (sliding) clearance is necessary between the lower dome and the lower mold mounting member upon clamping the molds. Further, the mold height adjusting device provided at the tip portion of the upper dome also requires a mechanical clearance. Accordingly, there is a possibility that the heat/pressure medium supplied into the dome space will escape from these clearances, resulting in universal adoption of the platen heating type in the prior art vertical tire press.

SUMMARY OF THE INVENTION

It is a primary object of the present invention to provide a steam dome type tire press having a dome structure eliminating leakage of a heat/pressure medium from a dome space defined by the upper and lower domes, so as to effectively heat the upper and lower molds.

It is another object of the present invention to provide a steam dome type tire press having a structure preventing a mold clamping force from being applied to the press base, so as to reduce the weight of the press base.

According to the present invention, there is provided a steam dome type vertical tire press comprising an upper dome for holding an upper mold through an upper mold mounting member; a lower dome for holding a lower mold through a lower mold mounting member, said upper dome and said lower dome being abutted at respective connection edges; a dome lock ring adapted to be engaged with said connection edges of said upper and lower domes for locking the same; a central mechanism vertically movably located at a central position of said lower mold mounting member; a mold clamping cylinder having a pressure rod connected to said lower mold mounting member; a cylinder support extending downwardly from said lower dome through a press base for supporting said mold clamping cylinder; a mold height adjusting device provided outside a dome space defined by said upper and lower domes for adjusting a height between said upper and lower molds; and a heat/pressure medium sealing means interposed at least between an outer circumferential surface of said lower mold mounting member and an inner circumferential surface of said lower dome and between said connection edges of said upper and lower domes for sealing said abutting connection edges and for sealing a space between said lower mold mounting member and said lower dome, whereby said dome space is sealed.

According to the above-mentioned construction including an upper dome for holding an upper mold through an upper mold mounting member; a lower dome for holding a lower mold through a lower mold mounting member, said upper dome and said lower dome being openably closed at respective connection edges; a dome lock ring adapted to be engaged with said connection edges of said upper and lower domes; a central mechanism vertically movably located at a central position of said lower mold mounting member; a mold clamping cylinder having a pressure rod connected to said lower mold mounting member; and a cylinder support extending downwardly from said lower dome through a press base for supporting said mold clamping cylinder, a basic structure in the vertical tire press is satisfied. Further, as the mold height adjusting device is provided outside the dome space defined by the upper and lower domes, a mechanical clearance required in mounting the mold height adjusting device to the dome may be eliminated.

Further, as the heat/pressure medium sealing means is interposed at least between the inner circumferential surface of the lower dome and the outer circumferential surface of the lower mold mounting member and between the connection edges of the upper and lower domes, the leakage of the heat/pressure medium may be reliably prevented. Accordingly, the upper and lower molds set in the upper and lower domes may be effectively and strongly heated by the heat/pressure medium.

Additionally, as the cylinder support for supporting the mold clamping cylinder is provided to extend downwardly from the lower dome through the press base, the mold clamping force of the mold clamping cylinder is not applied to the press base but applied to the cylinder support. Accordingly, the press base may be reduced in weight.

Other objects and features of the invention will be more fully understood from the following detailed description and appended claims when taken with the accompanying drawings.

DETAILED DESCRIPTION OF THE PREFERRED EMBODIMENTS

There will now be described some preferred embodiments of the present invention with reference to the drawings.

Figure 1:
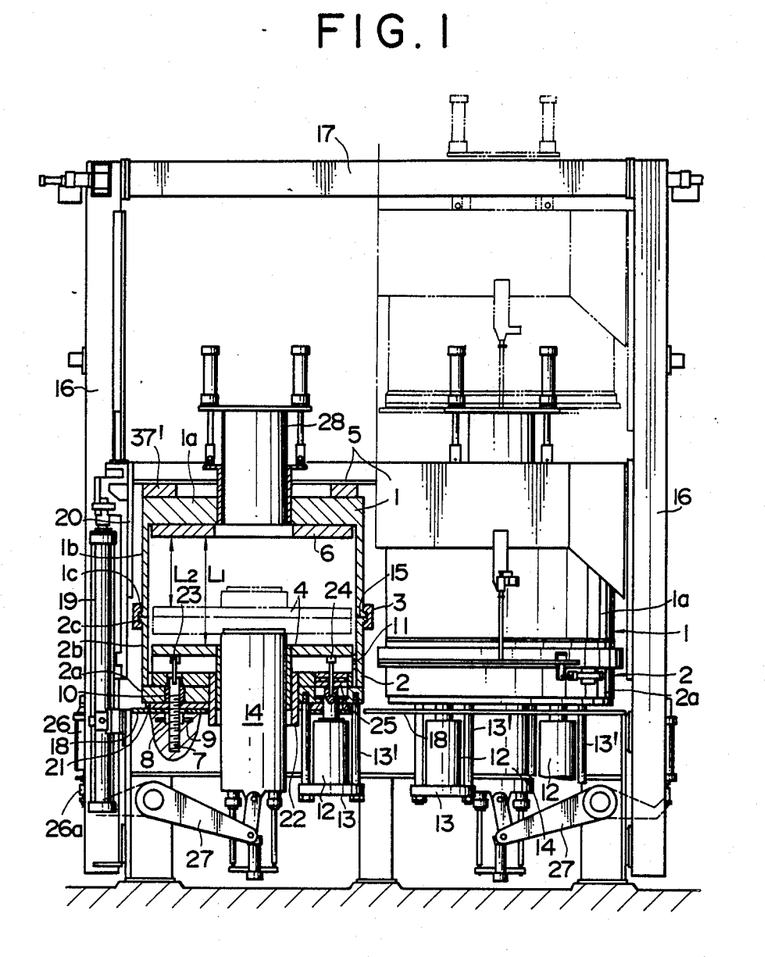
FIG. 1 is an elevational view in partial section of a first preferred embodiment according to the present invention.
Figure 2:
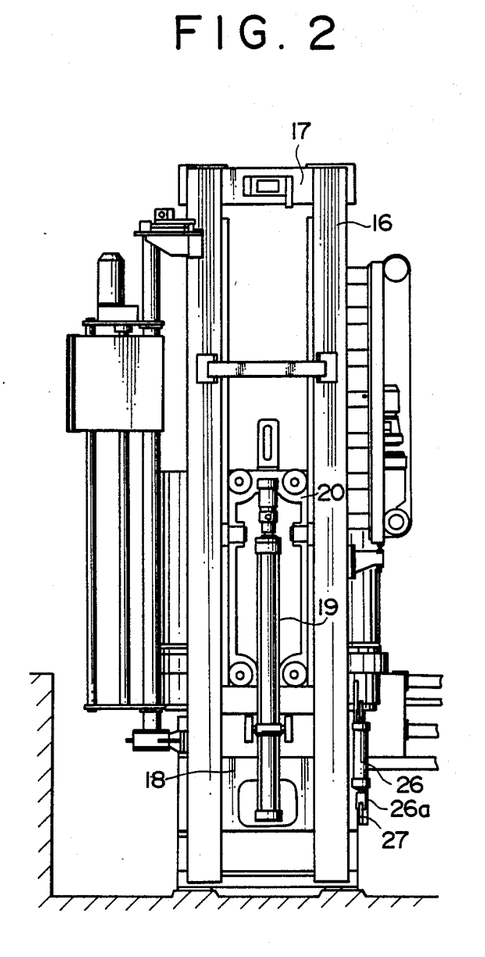
FIG. 2 is a side view of FIG. 1.

Referring first to FIGS. 1 to 4 which show a first preferred embodiment of the present invention, the vertical tire press is of a so-called twin type including a pair of sets of upper and lower mold assemblies arranged side by side in the same press frame, wherein a mold height adjusting device is provided outside a lower dome to be hereinafter described. As shown in FIGS. 1 and 2, the press frame is constructed of two side frames 16, a top frame 17 and a press base 18. A top slide 5 extends between both the side frames 16, and is vertically movable by a pair of guide mechanisms 20 slidably mounted to the side frames 16. Each guide mechanism 20 is provided between an end of the top slide and an end of a mold opening/closing cylinder 19 mounted to each side frame 16. Two right and left upper domes 1 are located under the top slide 5, and two right and left lower domes 2 are located above the press base 18. The right upper and lower domes 1 and 2 are arranged in concentrical relationship with an axis of the right press. Similarly, the left upper and lower domes 1 and 2 are arranged in concentrical relationship with an axis of the left press.

As the set of the left upper and lower domes 1 and 2 has the same structure as the set of the right upper and lower domes 1 and 2, the structure of the left set will now be described.

As well known, the upper dome 1 is constructed of a top portion 1a, a shell portion 1b extending downwardly from the top portion 1a and having an open bottom, and a lower connection edge 1c formed at the lower end of the shell portion 1b and adapted to be connected to the lower dome 2. An upper central mechanism 28 is provided at a central position of the top portion 1a concentrical with the axis of the left press in such a manner as to project upwardly. The upper central mechanism 28 is used when a known upper mold is of a segment type. An upper mold mounting member 6 for mounting the upper mold (not shown) is fixed to a lower surface of the top portion 1a.

On the other hand, the lower dome 2 is constructed of a bottom portion 2a, a shell portion 2b extending upwardly from the bottom portion 2a and having an open top, and an upper connection edge 2c formed at the upper end of the shell portion 2b and adapted to abut the lower connection edge 1c of the upper dome 1. As well known, a dome lock ring 3 such as a breach ring is releasably engaged with the outer circumferences of the upper and lower connection edges 1c and 2c when the upper and lower domes 1 and 2 are closed. A lower mold mounting member 4 for mounting a lower mold (not shown) is vertically movably located on the bottom portion 2a of the lower dome 2. The lower dome 2 is fixed through a heat insulator 21 onto the press base 18.

A central mechanism 14 including a molding bladder or the like is vertically movably inserted in a guide cylinder 22 located at central positions of the lower mold mounting member 4, the bottom portion 2a of the lower dome 2 and the press base 18. The central mechanism 14 is connected to a lifting lever 27 adapted to be rocked by a piston rod 26a of a lifting cylinder 26 mounted to the side frame 16.

Referring to FIG. 1, the height (thickness) of the upper and lower molds can be changed between a maximum value $L_1$ and a minimum value $L_2$ by a mold height adjusting device for adjusting the vertical position of the lower mold mounting member 4. The mold height adjusting device is constructed of plural (three or four)

support screws 7 fixed by bolts 23 at circumferentially equal intervals on the bottom surface of the lower mold mounting member 4 and extending downwardly from the bottom portion 2a of the lower dome 2 through bushes 10, plural adjusting nuts 8 rotatably mounted on the press base 18 and threadedly engaged with the support screws 7, plural sprockets 9 mounted on the adjusting nuts 8, and a driving chain (not shown) engaged with the sprockets 9. When the chain is driven, the sprockets 9 are synchronously rotated normally or reversely to rotate the adjusting nuts 8 and thereby vertically move the support screws 7, resulting in vertical movement of the lower mold mounting member 4. Thus, the mold height can be adjusted according to the size of the molding. Such a mold height adjusting device is merely exemplary, and any other mechanisms may be employed according to the present invention.

A plurality (three or four) of mold clamping cylinders 12 for generating a clamping force to be applied to the upper and lower molds by lowering both the upper and lower domes 1 and 2 assembled by the lock ring 3 are located under the bottom portion 2a of the lower dome 2 at circumferentially equal intervals. Each mold clamping cylinder 12 is retained by plural support rods 13' fixed to the bottom portion 2a of the lower dome 2 and inserted through the press base 18 and by a cylinder support 13 fixed to the lower ends of the support rods 13'. A pressure rod 12a of each mold clamping cylinder 12 is fixed by a bolt 24 to the lower surface of the lower mold mounting member 4 through a heat insulator 25.

A heat/pressure medium (steam) seal packing 15 is interposed between the connection edges 1c and 2c of the upper and lower domes 1 and 2, and heat/pressure medium seal packings 11 are also interposed between the outer circumferential surface of the lower mold mounting member 4 and the inner circumferential surface of the lower dome 2. The structures of these heat/pressure medium seal packings 15 and 11 will be hereinafter described.

As mentioned above, the lower mold mounting member 4 for mounting the lower mold is vertically movably mounted in the lower dome 2, and the vertical position of the lower mold mounting member 4 is adjusted according to the size of the moldings by the mold height adjusting device including the support screws 7, the adjusting nuts 8 and the sprockets 9. The mold height adjusting device is located outside the upper and lower domes 1 and 2. In other words, the mold height adjusting device is not located in the dome space defined by the upper and lower domes 1 and 2. Further, the heat/pressure medium seal packing 15 is interposed between the connection edges 1c and 2c of the upper and lower domes 1 and 2, and the heat/pressure medium seal packings 11 are also interposed between the outer circumferential surface of the lower mold mounting member 4 and the inner circumferential surface of the lower dome 2. Accordingly, a completely sealed dome space defined by the upper and lower domes 1 and 2 can be obtained to eliminate leakage of the heat/pressure medium such as steam and permit the upper and lower molds to be strongly heated. Thus, vulcanization of a large tire or the like can be properly carried out by the vertical tire press.

Further, the mold clamping cylinder 12 is retained by the support rods 13' passing through the press base 18 and the cylinder support 13 fixed to the lower ends of the support rods 13' under the press base 18. Therefore, the mold clamping force of the mold clamping cylinder 12 is not applied to the press base 18 but applied to the cylinder support 13. Accordingly, the press base 18 may be reduced in weight.

While it is necessary to vertically move the central mechanism 14 in association with the vertical movement of the lower mold mounting member 4, the vertical positioning of the central mechanism 14 can be easily obtained by the lifting lever 27 rockably connected to the lifting cylinder 26.

The vulcanization of tire in the preferred embodiment is similar to that by using a conventional vertical tire press, wherein the upper and lower domes 1 and 2 are completely closed and are connected by the dome lock ring 3, and the upper and lower molds are clamped by the mold clamping cylinders 12, and the heat/pressure medium is supplied into the dome space to heat the molds under pressure. In the preferred embodiment, the vertical position of the upper dome 1 upon closing both the domes is fixed irrespective of the mold height.

Figure 3:
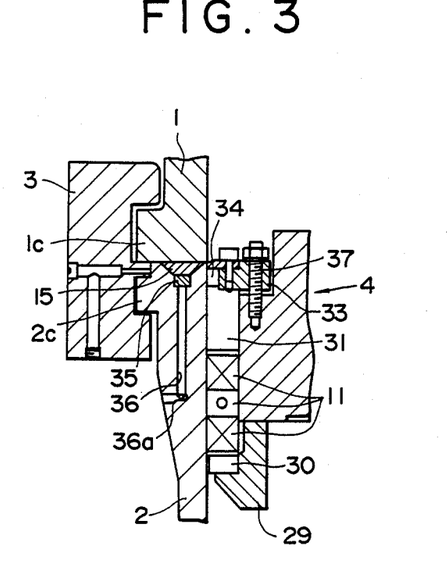
FIG. 3 is a vertical sectional view of the heat/pressure medium sealing structure.

Referring to FIG. 3 which shows an exemplary structure of the heat/pressure medium seal packings 11 to be interposed between the outer circumferential surface of the lower mold mounting member 4 and the inner circumferential surface of the lower dome 2, a stepped portion 29 is formed on the outer circumferential surface of the lower mold mounting member 4 to mount thereon an adapter 30, plural packings 11 stacked and a retainer 31 in this order. The retainer 31 is fixed by a packing gland 33 and a dust seal 34. The packing gland 33 is fixed by bolts 37 to the upper circumferential portion of the lower mold mounting member 4. The packings 11 have a suitable shape such as a V-shape in section.

Figure 4:
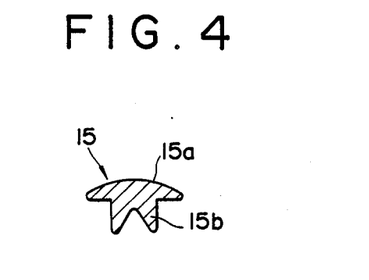
FIG. 4 is a sectional view of the seal packing shown in FIG. 3.

Referring to FIG. 4 which shows an exemplary structure of the heat/pressure medium seal packing 15 to be interposed between the connection edges 1c and 2c of the upper and lower domes 1 and 2, the packing 15 is formed with a head portion 15a and a forked portion 15b. Referring back to FIG. 3, the connection edge 2c of the lower dome 2 is formed with a circular recess 35 for receiving the packing 15. The lower dome 2 is formed with a passage 36 and a port 36a communicated with the passage 36. The passage 36 is communicated with the circular recess 35. A pressure medium (steam or water) is supplied from the port 36a through the passage 36 to the recess 35, thereby applying the pressure to the packing 15, so as to prevent the leakage of the heat/pressure medium from the dome space and improve the life of the packing 15. Such structures of the heat/pressure medium seal packings 11 and 15 are merely exemplary, and any other structures may be employed according to the present invention. Referring back to FIG. 1, reference numeral 37' designates a heat insulator to be interposed between the top portion 1a of the upper dome 1 and the top slide 5.

Referring next to FIGS. 5 to 9 which show a second preferred embodiment of the present invention, the vertical tire press is of a so-called single type, and the mold clamping cylinders 12 serve as the mold height adjusting device. In the drawings, the same reference numerals as those in FIGS. 1 to 3 designate the same members, and accordingly the explanation thereof will be omitted hereinafter.

Figure 5:
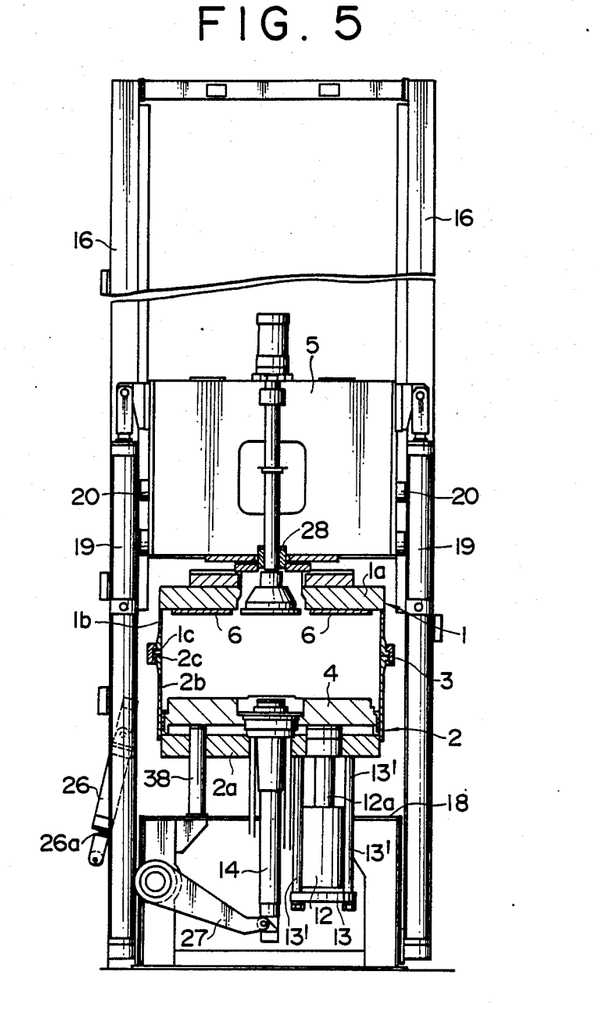
FIG. 5 is an elevational view in partial section of a second preferred embodiment according to the present invention.
Figure 6:
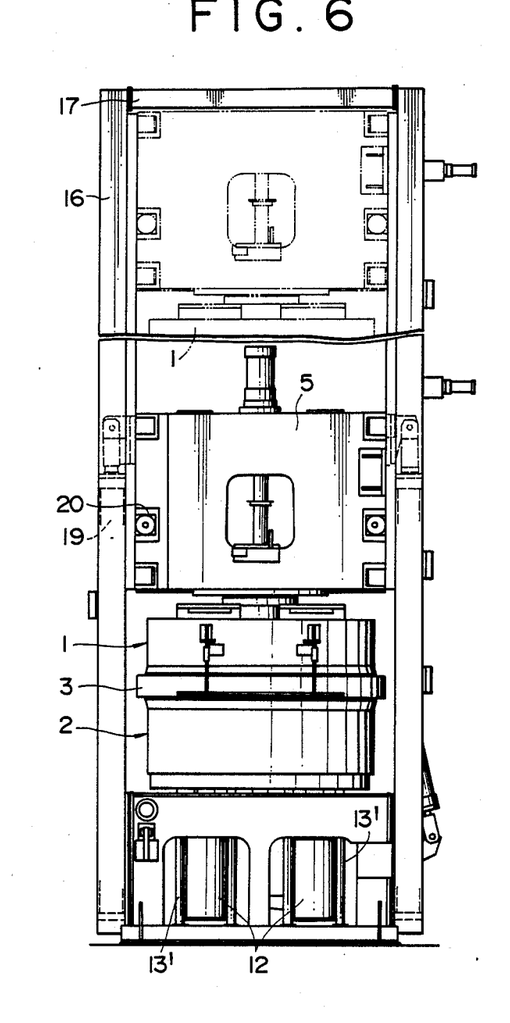
FIG. 6 is an elevational view of the second preferred embodiment.
Figure 7:
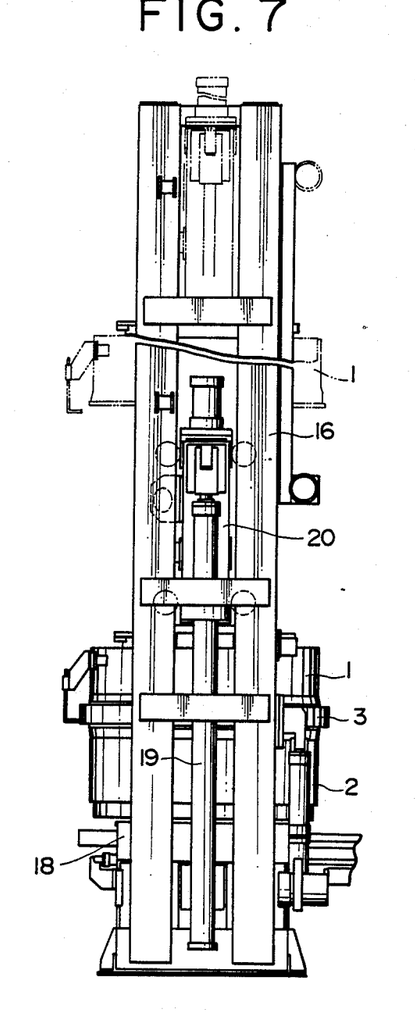
FIG. 7 is a side view of FIG. 5.

In the same manner as the first preferred embodiment, the upper dome 1 is retained to the top slide 5 vertically movable along the guide mechanisms 20 by the mold opening/closing cylinders 19, and the lower dome 2 is retained by the cylinder supports 13 located under the press base 18 by way of the support rods 13'. The pressure or piston rods 12a of the mold clamping cylinders 12 supported to the cylinder supports 13 are connected to the lower surface of the lower mold mounting member 4. In the second preferred embodiment, the stroke of the pressure rod 12a of each mold clamping cylinder 12 is set to a value more than the sum of mold height adjustment stroke and mold clamping stroke.

Accordingly, in adjusting the mold height, the lower dome 2 is vertically moved by the mold clamping cylinders 12. The lower mold mounting member 4 for mounting the lower mold (not shown) is retained at a fixed position by a plurality of support rods 38 fixed at their upper ends to the lower surface of the lower mold mounting member 4 at circumferential equally spaced positions. The lower ends of the support rods 38 are fixed to the press base 18.

In this manner, the lower dome 2 is vertically moved relative to the lower mold mounting member 4 located at the fixed position by moving the pressure rods 12a of the mold clamping cylinders 12 in accordance with the mold height. Then, the upper dome 1 is lowered by the mold opening/closing cylinders 19 to abut against the lower dome 2, thus closing both the domes 1 and 2. That is, the closing position of the upper dome 1 is variable depending on the mold height. FIG. 5 shows a maximum distance between the upper and lower molds, and FIG. 8 shows a minimum distance between the upper and lower molds.

Figure 8:
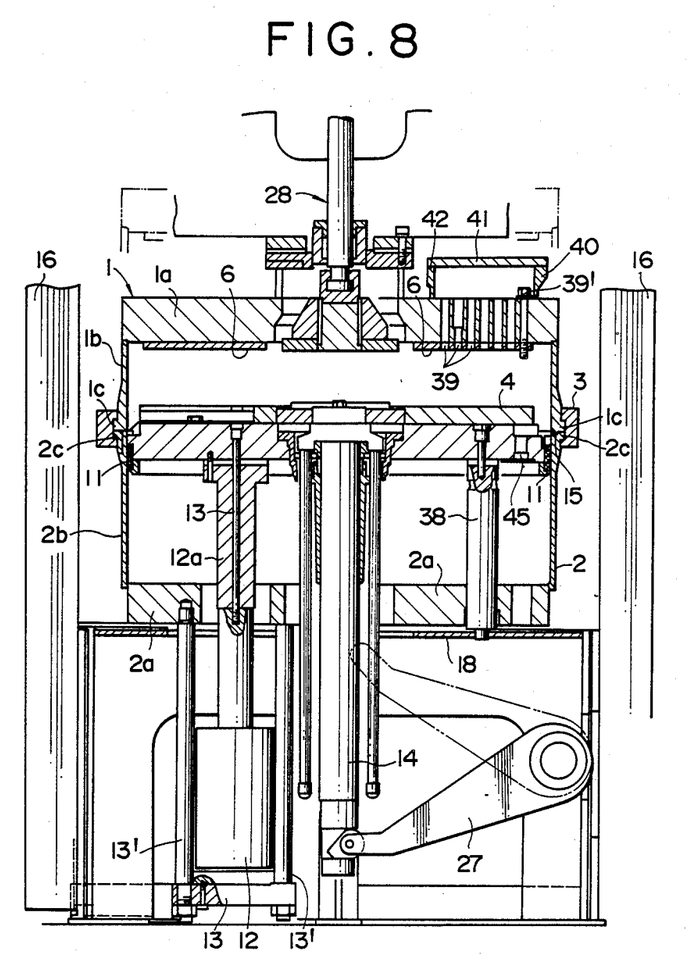
FIG. 8 is an elevational view in partial section of the essential part of the upper and lower domes shown in FIG. 5.

In the same manner as the first preferred embodiment, the heat/pressure medium seal packing 15 is interposed between the connection edges 1c and 2c of the upper and lower domes 1 and 2, and the heat/pressure medium seal packings 11 are interposed between the inner circumferential surface of the lower dome 2 and the outer circumferential surface of the lower mold mounting member 4 as shown in FIG. 8.

Figure 9:
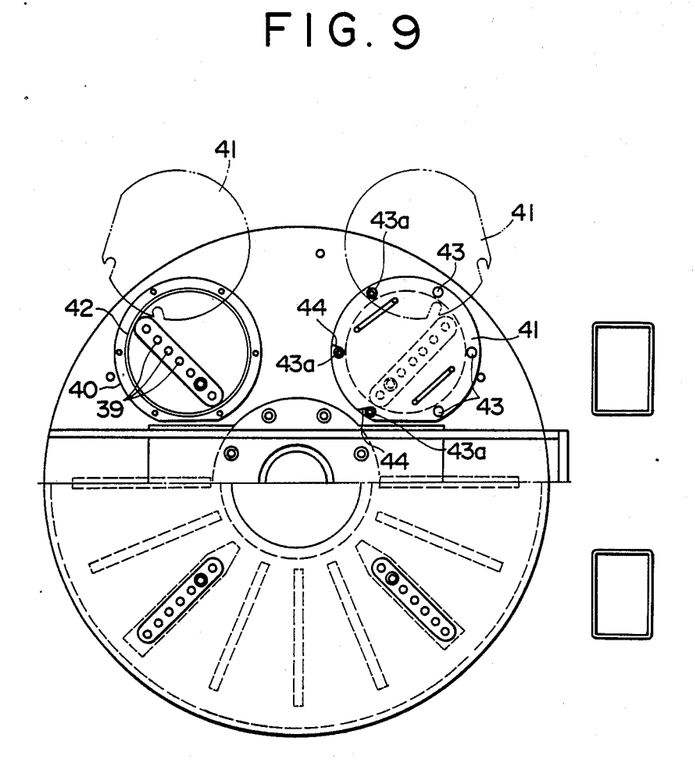
FIG. 9 is a plan view of the heat/pressure medium sealing means mounted on the top portion of the upper dome.

Referring to FIGS. 8 and 9, the top portion 1a of the upper dome 1 and the upper mold mounting member 6 are formed with a plurality of bolt holes 39 to be engaged with a plurality of bolts 39' for fixing the upper mold (not shown) to the upper mold mounting member 6. Such bolt fixing portions are preferably sealed by the following sealing means for the purpose of preventing the leakage of the heat/pressure medium in the dome space from the bolt fixing portions. That is, the sealing means comprises a plurality of seal chambers 40 mounted on the top portion 1a of the upper dome 1 in such a manner as to surround the bolt fixing portions, a plurality of caps 41 for openably closing the upper openings of the seal chambers 40, and a plurality of O-rings 42 interposed between the upper ends of the seal chambers 40 and the lower surfaces of the caps 41 for preventing the leakage of the heat/pressure medium such as steam. Referring to FIG. 9, each cap 41 is releasably mounted on the upper end of each seal chamber 40 through each O-ring 42 by a plurality of bolts 43. One of the bolts 43 is utilized as a pivot shaft for rotating the cap 41 therebout. Further, some recesses 44 are formed at the circumference of the cap 41 to engage some of the bolts 43 as numbered 43a. Such sealing structure having a pivotally openable cap 41 to be pivoted about one of the bolts 43 is merely exemplary, and any other structures may be of course employed.

The above-mentioned heat/pressure medium sealing means as shown in FIG. 9 may be applied to the first preferred embodiment. Reference numeral 45 in FIG. 8 designates a heat/pressure medium (steam) inlet/outlet formed at the circumference of the lower mold mounting member 4.

According to the second preferred embodiment as mentioned above, the mold height adjusting device, namely, the mold clamping cylinders 12 are located outside the dome space defined by the upper and lower domes 1 and 2. Further, the heat/pressure medium seal packings 11 are interposed between the inner circumferential surface of the lower dome 2 and the outer circumferential surface of the lower mold mounting member 4, and the heat/pressure medium seal packing 15 is interposed between the connection edges 1c and 2c of the upper and lower domes 1 and 2. Moreover, the heat/pressure medium sealing means including the seal chambers 40 with the O-rings 42 is provided at the bolt fixing portions of the upper mold mounting member 6. Therefore, the dome space defined by the upper and lower domes 1 and 2 can be made as a sealed steam dome for the vertical tire press. Further, as the mold clamping cylinders 12 are also utilized as the mold height adjusting device, the construction of the tire press is made simpler as compared with that of the first preferred embodiment.

In the event that fluid pressure (pressure oil) in the mold clamping cylinders 12 leaks in clamping the upper and lower molds, the upper and lower domes 1 and 2 are lifted by the pressure of the heat/pressure medium such as steam in the dome space, and the mold clamping cylinder 12 is also lifted until the lower end of the piston rod 12a abuts against the bottom surface of the cylinder body. This condition is shown in FIG. 5 wherein the distance between the upper and lower molds is maximum.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A steam dome type vertical tire press comprising:
   an upper dome having an upper mold mounting member for holding an upper mold;
   a lower dome having a lower mold mounting member for holding a lower mold, said upper dome and said lower dome abutting at respective connection edges;
   a dome lock ring engagable with said abutting connection edges of said upper and lower domes for locking said abutting connection edges;
   a central mechanism vertically movably mounted at a central position of said lower mold mounting member;
   a mold clamping cylinder having a pressure rod connected to said lower mold mounting member;
   a cylinder support extending downwardly from said lower dome and connecting to said mold clamping cylinder for supporting said mold clamping cylinder;
   a mold height adjusting device provided outside a dome space defined by said upper and lower domes and comprising means for adjusting a height between said upper and lower molds; and
   a heat/pressure medium sealing means interposed at least between an outer circumferential surface of said lower mold mounting member and an inner circumferential surface of said lower dome and between said connection edges of said upper and lower domes for sealing said abutting connection edges and for sealing a space between said lower mold mounting member and said lower dome, whereby said dome space is sealed.

2. The steam dome type vertical tire press as defined in claim 1, including a press base below said lower dome, wherein said mold height adjusting device comprises plural support screws fixed at circumferentially equal intervals on a bottom surface of said lower mold mounting member and extending downwardly from a bottom portion of said lower dome, plural adjusting nuts rotatably mounted on said press base and threadedly engaged with said support screws, plural sprockets mounted on said adjusting nuts, and a driving chain engaged with said sprockets, whereby rotation of said sprockets by said driving chain vertically moves said support screws and said lower mold mounting member.

3. The steam dome type vertical tire press as defined in claim 1, wherein said mold clamping cylinder comprises said mold height adjusting device.

4. The steam dome type vertical tire press as defined in claim 3, wherein a top portion of said upper dome and said upper mold mounting member are formed with a plurality of bolt holes to be engaged with a plurality of bolts for fixing said upper mold to said upper mold mounting member.

5. The steam dome type vertical tire press as defined in claim 4 further comprising a sealing means for sealing said bolt holes of said upper dome, wherein said sealing means comprises a plurality of seal chambers mounted on said top portion of said upper dome in such a manner as to surround said bolt holes, a plurality of caps mounted to said seal chambers for openably closing upper openings of said seal chambers, and a plurality of O-rings interposed between the upper ends of said seal chambers and the lower surfaces of said caps.

* * * * *